US006192921B1

(12) United States Patent
Plotz

(10) Patent No.: US 6,192,921 B1
(45) Date of Patent: Feb. 27, 2001

(54) SCREW-IN CARTRIDGE VALVE AND SCREW-IN CARTRIDGE VALVE ASSEMBLY

(75) Inventor: Walter Plotz, Poing (DE)

(73) Assignee: Heilmeier & Weinlein Fabrik fur Oel-Hydraulik GmbH & Co. (DE)

( * ) Notice: Subject to any disclaimer, the term of this patent is extended or adjusted under 35 U.S.C. 154(b) by 0 days.

(21) Appl. No.: 09/275,143

(22) Filed: Mar. 24, 1999

(30) Foreign Application Priority Data

Apr. 20, 1998 (DE) .......................................... 298 07 100 U

(51) Int. Cl.[7] ..................................................... F16K 27/00
(52) U.S. Cl. .......................................................... 137/454.5
(58) Field of Search ............................................ 134/454.5

(56) References Cited

U.S. PATENT DOCUMENTS

| | | | | |
|---|---|---|---|---|
| 4,611,629 | * | 9/1986 | Seiffert | 137/614.21 |
| 4,823,832 | * | 4/1989 | Rodstein | 137/454.5 |
| 5,050,633 | * | 9/1991 | Tarnay et al. | 137/454.5 |
| 5,217,260 | | 6/1993 | Boticki | 285/12 |
| 5,584,323 | | 12/1996 | Yamamuro | 137/625.65 |
| 5,590,683 | * | 1/1997 | Bennett | 137/454.5 |
| 5,617,890 | | 4/1997 | Brehm et al. | 137/82 |
| 5,718,264 | | 2/1998 | Sturman | 137/625.65 |

FOREIGN PATENT DOCUMENTS

| | | |
|---|---|---|
| 19625349 A1 | 2/1998 | (DE) . |
| 0 676 548 A1 | 11/1995 | (EP) . |

* cited by examiner

*Primary Examiner*—Stephen M. Hepperle
(74) *Attorney, Agent, or Firm*—Cook, Alex, McFarron, Manzo, Cummings & Mehler, Ltd.

(57) ABSTRACT

A screw-in cartridge valve for the employment in the field of high pressure hydraulic includes a valve housing having an exterior screw-in thread section extending between a low pressure or ambient pressure area and a high pressure area, said valve housing comprising a pressure balance path connecting both pressure areas with one another. In a screw-in cartridge valve assembly including a basic body having a threaded bore for said valve housing of said screw-in cartridge valve and including a sealing ring in said low pressure or ambient area activated by means of the thread tightening tension between both pressure areas at least one pressure balance path is provided by means of which the pressure acting in the high pressure area on said exterior thread section is transmitted into the low pressure or ambient pressure area of said exterior thread section.

1 Claim, 1 Drawing Sheet

SCREW-IN CARTRIDGE VALVE AND SCREW-IN CARTRIDGE VALVE ASSEMBLY

Figure 1:
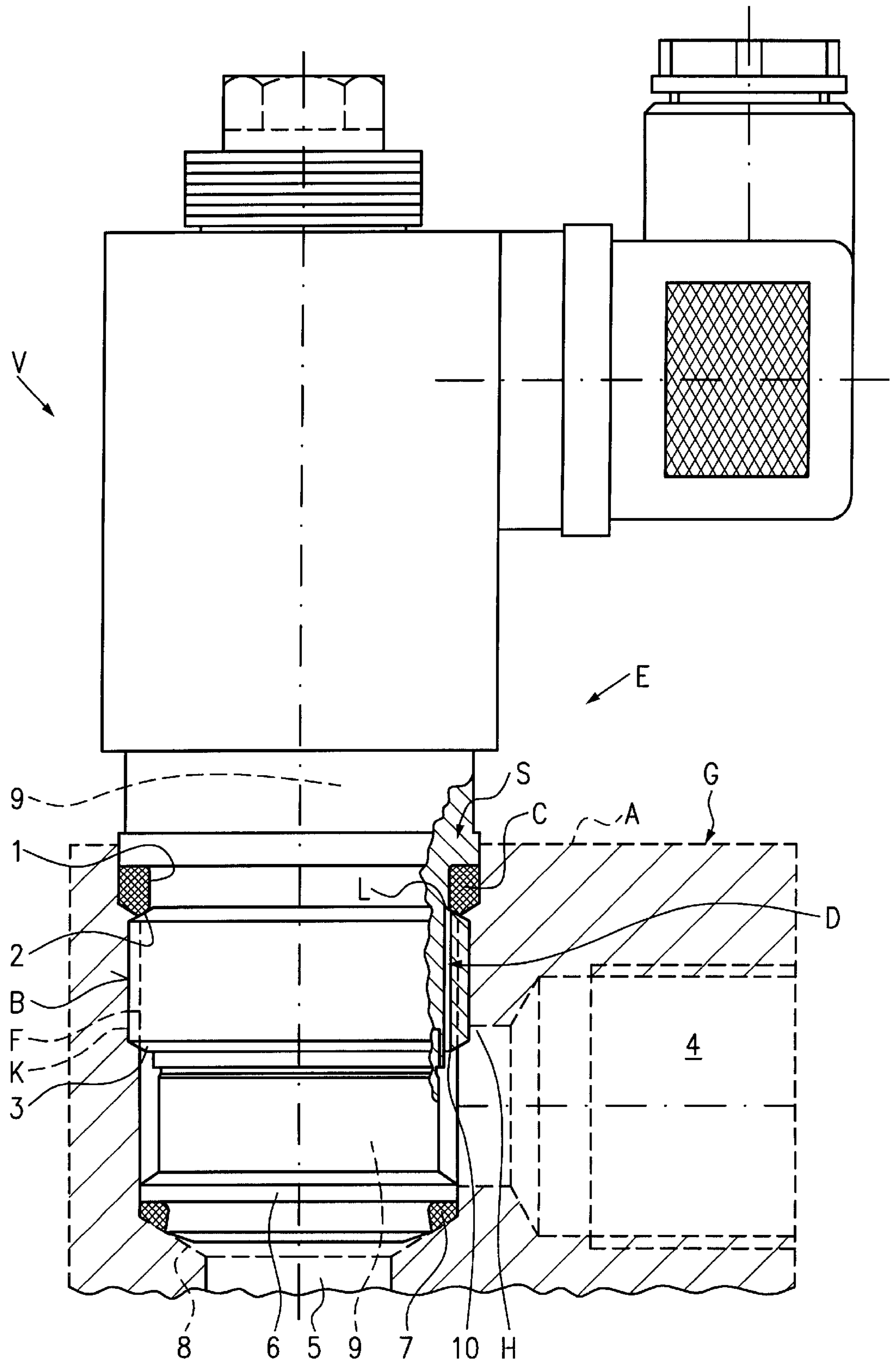

The invention relates to a screw-in cartridge valve and a screw-in cartridge valve assembly.

Screw-in cartridge valves or screw-in cartridge valve assemblies are of advantage in the high pressure—hydraulic field in order to realise different valve function variants in a space-saving manner, e.g. in block-structures. Typical cases of application from the practice, e.g. are described in product information P 7710-1 "screw-in cartridge valves type C", of the company Heilmeier & Weinlein, Fabrik für Oel-Hydraulik GmbH & Co. KG, edition 03/95 or the technical print D 7470-1 "2/2-ports-screw-in cartridge valves EM" of the company Heilmeier & Weinlein, Fabrik für Oel-Hydraulik GmbH & Co. KG, March 1996. The threaded bore into which the screw-in cartridge valve is to be screwed is communicating with pressure media passages at which the respective needed valve function is required. The threaded bore can be provided in a block as well as directly in a hydraulic component like a hydraulic cylinder or a hydraulic motor and normally is open towards an exterior side where ambient pressure is present. Sealing against said exterior side either is carried out by means of a sealing ring pressed against said exterior side or a sealing ring provided in said threaded bore close to its exterior mouth. In any case the provided sealing ring is activated by means of the thread tightening tension of the screwed-in valve housing of said screw-in cartridge valve.

Since in operation normally high pressure is biasing said valve housing counter to the screw-in-direction and since pressure impacts are occurring during operation a loosening torque is generated in the threaded connection (due to the pitch angle) which torque, e.g. after 50,000 load switches, may loosen the valve housing in said threaded bore which may disturb the valve the functions or may even eliminate it. Since not in all cases of applications a torque metering wrench is used for mounting said screw-in cartridge and since, furthermore, only with relatively small bore diameters, e.g. less than 16 mm, a sufficiently strong tightening torque is possible, inter alia depending on the material matching between the valve housing and the basic body (steel, cast iron, aluminium, etc.) this leads to a significant disadvantage of screw-in cartridge valves or screw-in cartridge valve-assemblies.

It is an object of the invention to provide a screw-in cartridge valve or a screw-in cartridge valve assembly with which the danger of uncontrolled loosening of the threaded connection during operation is prevented and for which the requirements for mounting the screw-in cartridge valve can be mitigated.

Through the pressure balancing passage the interior high pressure also is active at the other end of the exterior thread section such that in case of pressure impacts the generation of a loosening torque can be prevented. The requirements to consider very precise tightening torques can be relaxed because of the elimination of the danger of an uncontrolled loosening. Particularly with bigger thread diameters, e.g. of 16 mm or more, material matchings can be realised which could not be allowed until now due to the potential loosening danger, because the necessary tightening torque can now be set such that only the necessary tightness can be assured without taking into consideration the danger of an uncontrolled loosening due to an insufficiently strong tightening torque.

In an screw-in cartridge valve assembly the high pressure acting in the high pressure region also reaches the sealing which is activated by the tightening tension of the threads such that pressure impact cannot generate any loosening force in the threaded connection. Even with a moderate tightening torque, just sufficient for the necessary sealing effect, loosening of the screw-in valve can be avoided.

The valve housing itself is provided with the pressure balancing passage. Independent of which threaded bore or which basic body is used for the screw-in cartridge valve, permanently the danger of uncontrolled loosening is eliminated.

The pressure balancing passage is predetermined by local stripping of the threads in the thread region at the valve housing, in a way which is simple to manufacture.

Alternatively, slitting of threads is provided so that the pressure can be equalised via the slits.

It is to be noted that ideally the pressure balancing path should connect both end of the exterior thread with another. However, an extensive reduction of the danger of loosening can already be achieved if said pressure balance path just extends into the end portion of the exterior thread at the low pressure side without extending completely into the low pressure region. The pressure balance path is comfortably provided in valve housing, seen with respect to manufacturing.

Alternatively the pressure balance path is provided in the basic body in the form of a passage.

The pressure balance path is built into the thread connection by local strippings by grinding or slitting, or by intended selection of an unusual loose thread fit tolerance between the interengaging threads.

The screw-in cartridge valve or the screw-in cartridge valve assembly can be used for different valve functions where a danger of pressure impacts exists at the high pressure side.

The screw-in cartridge valve assemblies are protected against loosening, the thread root diameter of which is equal to or larger than 16 mm, preferably equal to or larger than 20 mm.

By means of the drawing an embodiment of a screw-in cartridge valve will be explained. In FIG. 1 a screw-in cartridge valve is shown within a screw-in cartridge valve assembly, partly in a axial section.

A screw-in cartridge valve V, e.g. a magnet actuated multi-port seat valve, is provided with a valve housing S terminating at one end sleevelike, in which housing valve components 9 are received necessary for the intended valve function. In the shown embodiment said valve components 9 are protruding downwardly beyond said valve housing S. The screw-in cartridge valve V is a structural unit being freely available on the market and is screwed into or can be screwed in a threaded bore B of a basic body G, said threaded bore B being formed according to the requirement of the manufacturer of the screw-in cartridge valve V. In the screw-in cartridge valve assembly E as shown in FIG. 1, said valve housing S is screwed with an axial exterior thread section F into an interior thread section K of threaded bore B such that a sealing ring C positioned in a circumferential groove 1 of valve housing S is compressed in order to develop a required sealing effect towards the exterior side. A flank 2 of circumferential groove 1 is defining an end portion of exterior thread section F, while shoulder 3 is defining the other end portion of exterior thread section F. With a distance below the free exterior side A of basic body G bores 4, 5 are opening into threaded bore B. Said bores 4, 5 are forming pressure media-passages which are separated from one another by means of a sealing 7 which is compressed between a shoulder 6 of valve component 9 and a bore shoulder 8. At the inner end portion 3 of exterior thread section F a high pressure area H is existing, while at the upper end portion 2 of exterior thread section F low pressure or ambient pressure L is provided.

According to the invention the pressure present in the high pressure area H is transmitted by means of a pressure balancing path D into the low pressure or ambient pressure area L, optionally to said sealing C, in order to create a pressure balance in the threaded connection in axial direction as much as possible, so that pressure impacts occurring in said high pressure area H do not generate a loosening torque for the exterior thread section F of valve housing S.

The pressure balancing path D may be built differently in view to its design. In FIG. 1 only one pressure balance path D is indicated, even though in practice several pressure balancing paths may be distributed about the circumference of the thread connection.

Within valve housing S a longitudinal bore 10 is provided and shown in full lines which extends at the inner side of external thread section F and scarcely below its threads between shoulders 2, 3. An alternative pressure balance path D' is indicated in dotted lines which is connecting the high pressure side with the low pressure side H, L in the form of a passage 11 in basic body G. As a further alternative the pressure balance path D" is indicated in the threaded connection itself. In this case the crests of the threads of the exterior thread section F and/or the thread crests of the interior thread section K could be machined or stripped locally, e.g. by grinding or milling or flattening. Furthermore, it is possible to form axial slits through the threads, e.g. by grinding or milling, particularly in the threads of the exterior thread section F and/or of the interior thread section K: Finally the pressure balance path D" also could result from a relatively loose thread fit or tolerance selected intentionally between the interior thread section K and the exterior thread section F, in order to transmit pressure from the high pressure area between the threads towards the low pressure area L.

What is claimed is:

1. A screw-in cartridge valve (V) for high pressure hydraulics, including a valve housing (S) having exterior threads (F) extending between a low pressure area (L) and a high pressure area (H), said threads having a low pressure end portion (2) located at said low pressure area (L) and a high pressure end portion (3) located at said high pressure area (H), characterized in that a pressure balance path (D) connects said low pressure area (L) and said high pressure area (H), and a sealing ring (C) is positioned between said valve housing (S) and said exterior threads (F) at said high pressure area (H) of said pressure balance path (D), said pressure balance path (D) is formed as a bore (10) extending along and below said exterior threads (F) to said sealing ring (C).

* * * * *